(12) United States Patent
Victor et al.

(10) Patent No.: US 7,119,978 B2
(45) Date of Patent: Oct. 10, 2006

(54) CONDENSATION COMPENSATION IN A MOTION CONTROL SYSTEM

(75) Inventors: Chew WengKhin Victor, Singapore (SG); David KokLeong Loh, Singapore (SG); Gan Kah Liang, Singapore (SG); Djohni Chandra, Singapore (SG); Myint Ngwe, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 211 days.

(21) Appl. No.: 10/859,266

(22) Filed: Jun. 2, 2004

(65) Prior Publication Data
US 2005/0270679 A1    Dec. 8, 2005

(51) Int. Cl.
  *G11B 19/02*  (2006.01)
  *G11B 21/02*  (2006.01)
  *G11B 19/04*  (2006.01)
(52) U.S. Cl. .............................. 360/69; 360/60; 360/75
(58) Field of Classification Search ...................... None
  See application file for complete search history.

(56) References Cited

U.S. PATENT DOCUMENTS

| 4,598,333 | A |   | 7/1986 | Adams et al. |
| 4,642,715 | A | * | 2/1987 | Ende .......................... 360/97.02 |
| 4,831,476 | A | * | 5/1989 | Branc et al. ............. 360/97.02 |
| 4,951,166 | A |   | 8/1990 | Schewe |
| 5,101,303 | A |   | 3/1992 | Maeda et al. |
| 5,341,262 | A |   | 8/1994 | Yamasaki et al. |
| 5,342,500 | A |   | 8/1994 | Inanaga et al. |
| 5,726,622 | A |   | 3/1998 | Furuyama et al. |
| 6,335,843 | B1 |  | 1/2002 | Yotsuya et al. |
| 6,515,815 | B1 |  | 2/2003 | Yotsuya et al. |
| 6,735,035 | B1 | * | 5/2004 | Smith et al. ................... 360/69 |

FOREIGN PATENT DOCUMENTS

| JP |   02193387 A | * | 7/1990 |
| JP |     7320453  |   | 12/1995 |
| JP |   2002157873 |   | 5/2002 |

* cited by examiner

*Primary Examiner*—K. Wong
(74) *Attorney, Agent, or Firm*—Westman, Champlin & Kelly

(57) ABSTRACT

A motion control system has an enclosed assembly that encloses moving parts. A controller controls a motion of the moving parts and has an inhibit input that inhibits the motion. A sensor provides sensor outputs that depend on an assembly temperature and an assembly humidity in the enclosed assembly. A circuit provides a condensing condition output as a function of the sensor outputs. The condensing condition output couples to the inhibit input to inhibit the motion as a function of the sensor outputs.

30 Claims, 10 Drawing Sheets

CONDENSATION COMPENSATION IN A MOTION CONTROL SYSTEM

FIELD OF THE INVENTION

The present invention relates generally to condensation compensation in motion control systems, and more particularly but not by limitation to condensation compensation in data storage devices.

BACKGROUND OF THE INVENTION

When hard disc drives are used in laptop, desktop and server applications, the hard disc drive is enclosed in a computer housing. The thermal mass of the housing tends to buffer or slow down a rate of temperature drop in the disc drive when the surrounding environment cools. With these slower temperature drops, there is usually enough time for humidity in the disc drive to slowly vent into the surrounding environment through a filter so that condensation inside the disc drive is avoided. However, as smaller disc drives are increasingly used in portable devices such as MP3 music players and personal digital assistants (PDAs) which have low thermal mass, there are more rapid temperature drops in the disc drive and condensation inside the disc drive can occur. In particular, a disc drive may be carried from a warm humid indoor environment to a cold outdoor environment and condensation will form in the disc drive as the disc rapidly cools.

When condensation forms inside the disc drive, it can adversely affect disc write operations because moisture on the magnetic disc surface is known to adversely affect disc lubrication and head-media spacing. The condensation can cause head crashes. Condensation on the disc also causes an effective change in the coercivity of the media and will generally create bad writes and media defects.

The problem with condensation is particularly difficult in hard disc drives and other enclosed assemblies which are completely sealed except for a filter which keeps contaminating particles out of the enclosed assembly but permits pressure equalization. There is little exchange of air between an interior space of the disc drive and its surrounding environment, except during temperature changes. Changes in environment temperature can draw humid air into the disc drive, and then it is difficult to remove the humidity.

A method and apparatus are needed to prevent damage to moving parts in an enclosed assembly when moisture condensing conditions are present inside the enclosed assembly. Embodiments of the present invention provide solutions to these and other problems, and offer other advantages over the prior art.

SUMMARY OF THE INVENTION

Disclosed is a motion control system comprising a controller that controls a motion of the moving parts in an enclosed assembly. The controller has an inhibit input that inhibits the motion.

The motion control system further comprises a sensor that provides sensor outputs. The sensor outputs depend on an assembly temperature and an assembly humidity in the enclosed assembly.

The motion control system also includes a circuit that provides a condensing condition output. The condensing condition output couples to the inhibit input. The condensing condition output controls inhibition of the motion as a function of the sensor outputs.

Other features and benefits that characterize embodiments of the present invention will be apparent upon reading the following detailed description and review of the associated drawings.

DETAILED DESCRIPTION OF ILLUSTRATIVE EMBODIMENTS

Disclosed is a motion control system that inhibits a motion of moving parts in an enclosed assembly when temperature and humidity conditions are such that water condensing conditions are approached inside the enclosed assembly. Inhibiting motion of the moving parts until after any liquid condensation has evaporated avoids malfunction or damage of the moving parts. For example, the arrangement can be used in a hard disc drive to avoid read/write errors and head crashes. After liquid condensation is removed, then the motion inhibition is removed and normal operation of the motion control system resumes. The motion control system can be used to inhibit damaging motion when condensing conditions are approached in hard disc drives and other enclosed assemblies which are completely sealed except for a filter.

Figure 1:
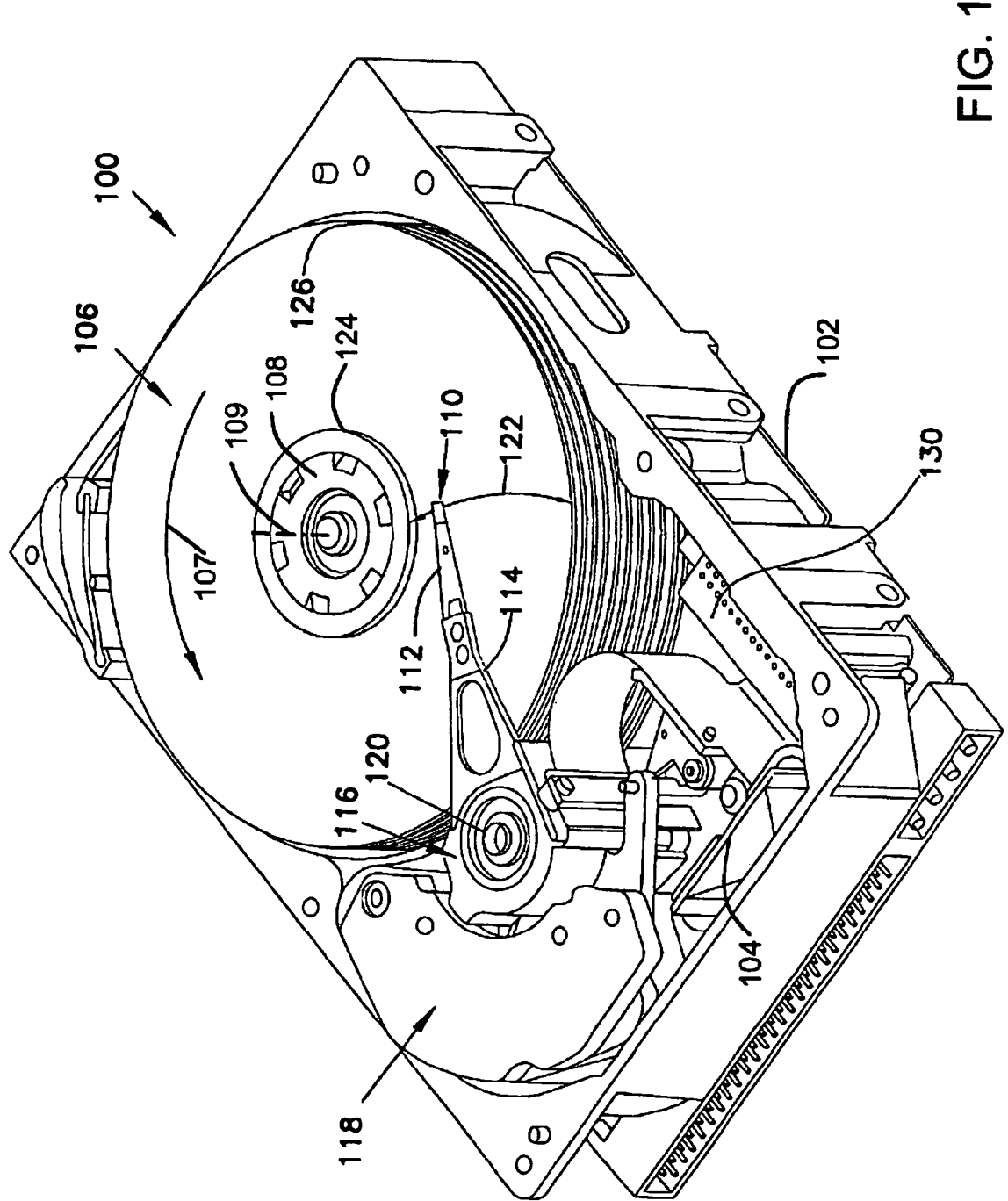
FIG. 1 illustrates an oblique view of a disc drive.

FIG. 1 illustrates an oblique view of a disc drive 100 in which embodiments of the present invention are useful. Disc drive 100 includes a housing with a base 102 and a top cover (not shown) that closes the housing to form an enclosed assembly. The base 102 includes a breathing hole 104 that is sealed with a porous filter that allows air and humidity to move in and out of the disc drive 100 as temperature or atmospheric pressure changes. Breathing hole 104 may also be located in other areas of the housing. Disc drive 100 further includes a disc pack 106, which is mounted on a spindle motor (not shown) by a disc clamp 108. Disc pack 106 may include one or a plurality of individual discs, which are mounted for co-rotation in a direction indicated by arrow 107 about central axis 109. Each disc surface has an associated disc read/write head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118.

Voice coil motor 118 rotates actuator 116 with its attached read/write heads 110 about a pivot shaft 120 to position read/write heads 110 over a desired data track along an arcuate path 122 between a disc inner diameter 124 and a disc outer diameter 126. Voice coil motor 118 is driven by electronics 130 based on signals generated by read/write heads 110 and a host computer (not shown).

Figure 2:
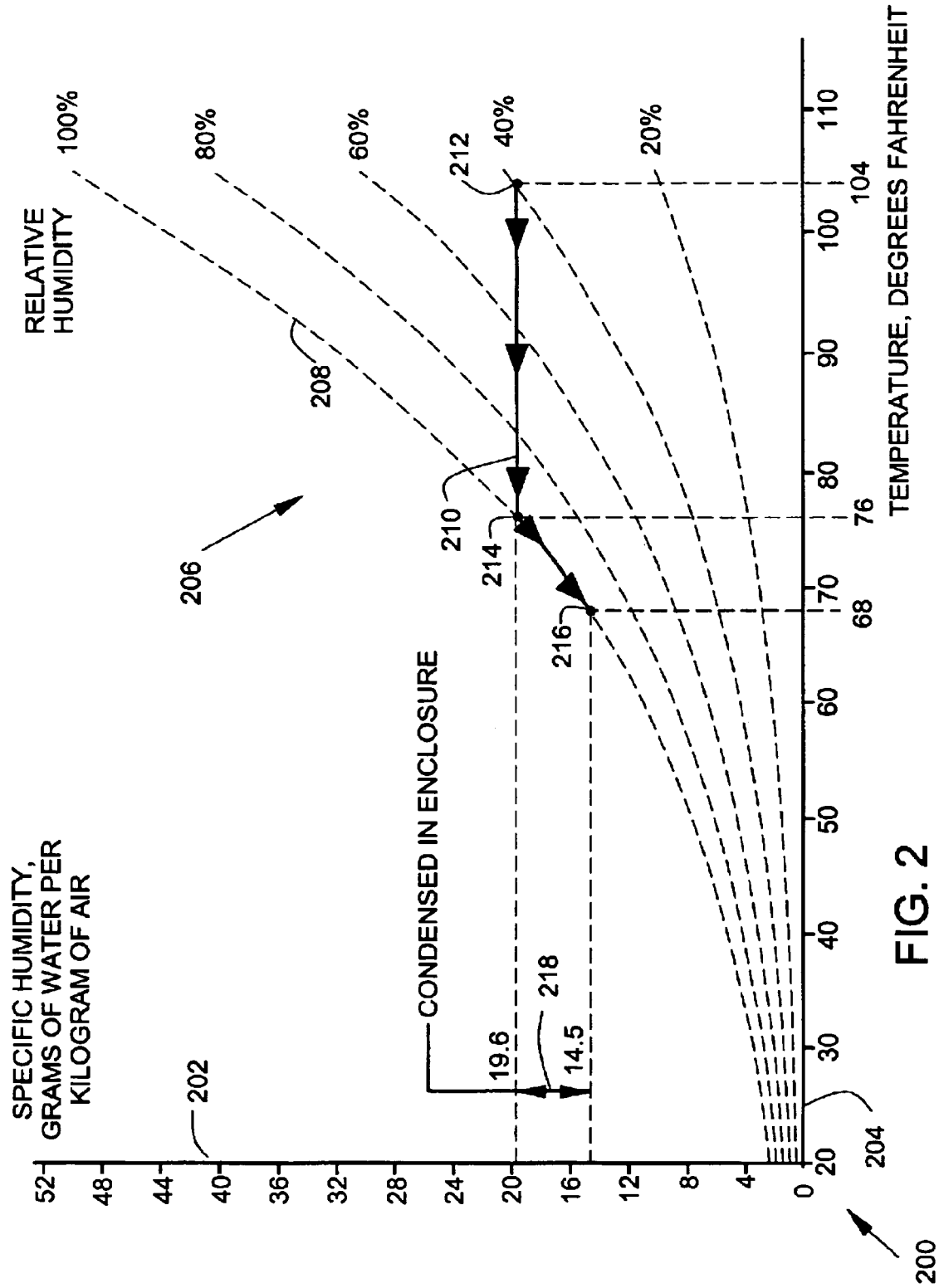
FIG. 2 illustrates a graph of specific humidity as a function of temperature.

FIG. 2 illustrates a graph 200 of specific humidity of air in an enclosed assembly (such as disc drive 100 in FIG. 1) at atmospheric pressure as a function of temperature. A vertical axis 202 represents specific humidity in grams of water per kilogram of air, and a horizontal axis 204 represents temperature in degrees Fahrenheit. Dashed curves 206 represent lines of constant relative humidity at 20%, 40%, 60%, 80% and 100% relative humidity. Each point on the graph 200 that lies at or below a 100% relative humidity curve 208 represents a combination of relative humidity and temperature that defines one possible humidity state of the air within the enclosed assembly.

In FIG. 2, a solid line 210 illustrates a series of successive humidity states of the air in the enclosed assembly as the enclosed assembly is cooled from 104 degrees Fahrenheit to 68 degrees Fahrenheit. An initial state 212 is at an air temperature of 104 degrees Fahrenheit and 40% percent relative humidity. An intermediate state 214 is at an air temperature of about 76 degrees Fahrenheit and 100% humidity. At the intermediate state 214, the air is fully saturated and any further cooling will result in condensation of the humidity to form liquid water on surfaces inside the enclosed assembly. At a final state 216, the air is fully saturated (100% humidity) at a final cooled air temperature of 68 degrees Fahrenheit.

When an enclosed assembly filled with humid air is cooled further after a state of 100% relative humidity is reached, then there is a potential for condensation to form on surfaces inside the enclosed assembly. As the air is cooled, the ability of the air to hold humidity decreases. During cooling from state 212 to 214, the specific humidity in the enclosed assembly remains essentially constant while the relative humidity increases from 40% to 100%. Once 100% relative humidity is reached at state 214, the air is fully saturated with humidity. Any further cooling will result in condensation of liquid water. As the temperature is cooled further moving from state 214 to state 216, liquid water is formed on inner surfaces in the enclosed assembly. Between states 214 and 216, the specific humidity decreases from about 19.6 grams per kilogram to about 14.5 grams per kilogram. The amount of condensation 218 is about (19.6– 14.5=) 5.1 grams of water per kilogram of air.

In traditional use of hard disc drives in laptop, desktop and server applications, the disc drive is enclosed in the computer housing which tends to buffer or slow down a rate of temperature drop in the disc drive. With these slower temperature drops, there is enough time for humidity in the disc drive to ventilate into the surrounding environment so that condensation is avoided inside the disc drive. However, as smaller disc drives are increasing used in applications where the disc dive is often exposed to the environment (such as in portable MP3 music players, personal digital assistants (PDAs), etc.), there is a need to preserve hard-disc data integrity in the presence of temperature and humidity changes as disclosed below in connection with FIGS. 3–10.

Figure 3:
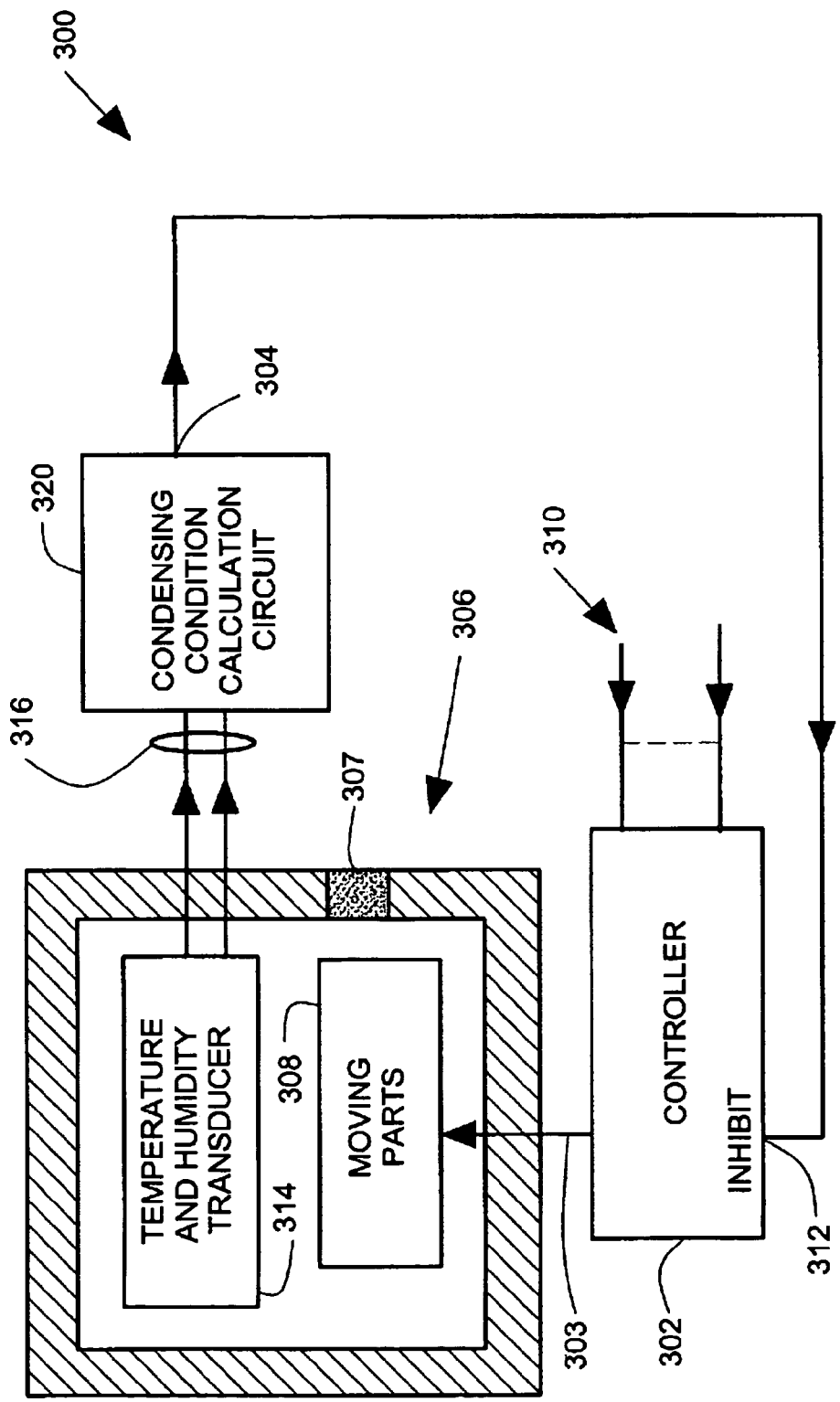
FIG. 3 illustrates a motion control system including a controller that is inhibited by a condensing condition output.

FIG. 3 illustrates a motion control system 300 that includes a motion controller 302 that is inhibited by a condensing condition output 304 when a potential for condensation is sensed.

The motion control system 300 comprises an enclosed assembly 306 that encloses moving parts 308. The motion control system 300 can take a variety of forms, but typically comprises a magnetic storage device such as a hard disc drive that includes moving discs and a moving read/write head such as described above in connection with FIG. 1. The enclosed assembly 306 is sealed except for a porous filter 307 that blocks contaminating particles in the environment from entering the enclosed assembly, but allows a small airflow to equalize pressure in the enclosed assembly 306 with the surrounding environment. The porous filter 307 allows only a little air (which may be humid) to enter and exit the enclosed assembly. The porous filter 307 can take a variety of forms such as a porous ceramic part, a sintered metal part or a porous foam strip. If desired, the porous filter 307 may be integrated with other components such as an electrical feedthrough for a ribbon cable.

The motion controller 302 receives control inputs 310 and provides one or more electrical outputs 303 that control one or more motions of the moving parts 308. In the case of a hard disc drive, for example, the control inputs 310 can comprise a signal generated by a host computer (indicating a desired track to be read) and a signal generated by a read/write head (indicating a current track being read) and the moving parts 308 can comprise a head moving on a hard disc.

The motion controller 302 also has an inhibit input 312 that, when actuated, inhibits at least one motion of the moving parts 308. A sensor 314 in the enclosed assembly 306 senses temperature and humidity and provides sensor outputs 316 that represent temperature and humidity. The sensor outputs 316 depend on an assembly temperature and an assembly humidity in the enclosed assembly 306.

The motion control system 300 also includes a circuit 320 that provides the condensing condition output 304. The condensing condition output 304 couples to the inhibit input 312. The condensing condition output 304 controls inhibition of the motion of moving parts 308 as a function of the sensor outputs 316.

When temperature and humidity conditions in the enclosed assembly 306 approach condensing conditions for the moving parts 308, then the condensing condition circuit 304 actuates the inhibit input 312 of the controller 302 to inhibit motion of the moving parts 308. Actuation of the inhibit input 312 overrides normal control functions of the controller 302 that are based on the inputs 310. The inhibition of motion can take the form of completely stopping motion of the moving parts 308, partially stopping motion of the moving parts 308 or changing the motion of the moving parts 308 in a way that avoids malfunction or damage of the moving parts 308. Examples of methods of inhibition are described in more detail below in connections with examples illustrated in FIGS. 7–10.

The sensor 314 provides two sensor outputs 316 that depend on temperature and humidity, and then the circuit 320 calculates the condensing condition output based on sensed temperature and humidity. This indirect calculation of condensing conditions has the advantage of high reliability and avoids the unpredictability of performance found in condensation sensors that sense liquid condensation only after the condensation has already formed. The arrangement shown in FIG. 3 allows sensing when temperature and humidity conditions approach condensing conditions but condensation has not yet formed. The arrangement in FIG. 3 allows inhibition action to be taken before there is actual condensation. Damage to the moving parts 308 is thus avoided. This arrangement is especially useful with closely fitting moving parts (such as read/write heads and discs) that must be enclosed to exclude dust contamination and that experience rapid environmental temperature changes.

Figure 4:
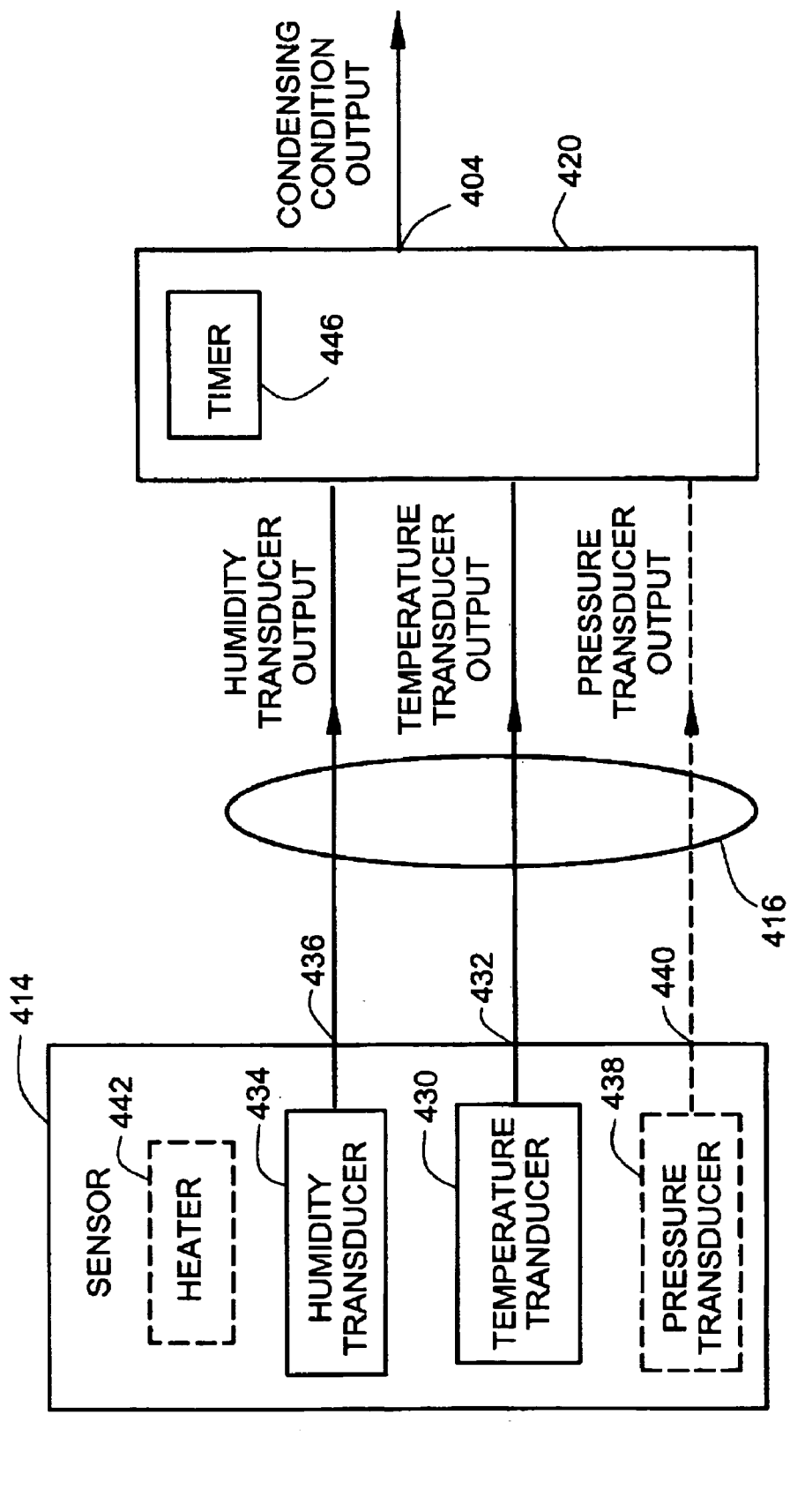
FIG. 4 illustrates a sensor and a circuit providing a condensing condition output.

FIG. 4 illustrates an example 400 of a sensor 414 (similar to sensor 313 in FIG. 3) and a circuit 420 (similar to circuit 320 in FIG. 3) providing a condensing condition output 404 (similar to condensing condition output 304 in FIG. 3). The sensor 414 comprises an assembly of at least a temperature transducer 430 providing a temperature transducer output 432 and a humidity transducer 434 providing a humidity transducer output 436. In one preferred embodiment, the sensor 414 also comprises a pressure transducer 438 providing a pressure transducer output 440. In another preferred embodiment, the sensor 414 comprises a heater 442 that heats the sensor 414.

The humidity transducer output 436, the temperature transducer output 432 and the optional pressure transducer output 440 together comprise sensor outputs 416 that couple to the circuit 420.

It will also be understood by those skilled in the art that the humidity transducer 434 and the temperature transducer 430 can give inaccurate readings if there is liquid water condensed on sensing surfaces of the transducers 434, 430. In a preferred embodiment, the small electric heater 442 is provided to ensure that the transducers 434, 430 are heated to a temperature that is higher than the assembly temperature to avoid condensation on sensing surfaces. It will also be understood by those skilled in the art that the humidity transducer output 436 can be sensitive to temperature and that the circuit 420 can optionally calculate temperature correction of the humidity transducer output 436 based on the temperature indicated by the temperature transducer output 432. In one preferred arrangement, the temperature transducer 430 comprises a thermistor that is also used to provide temperature sensing for other purposes in a disc drive.

It will also be understood by those skilled in the art that condensing conditions can depend on air pressure and that the optional air pressure transducer 438 can be provided so that the circuit 420 can optionally calculate pressure correction of condensing conditions.

The circuit 420 utilizes the outputs 416 to ascertain whether or not there is a danger of condensation. If there is a danger of condensation, then the condensing condition output 404 is actuated in order to inhibit motion. Once an approach to condensing conditions has been sensed, and then later the temperature increases to end the condensing conditions, it is found that there can be a lag time during which condensation can still be present while the condensation evaporates. In order to avoid starting up motion too quickly, the circuit 420 includes a timer 446 that actuates the condensing condition output 404 for a period of time after non-condensing conditions are restored, as described below in connection with an example illustrated in FIG. 7.

Figure 5:
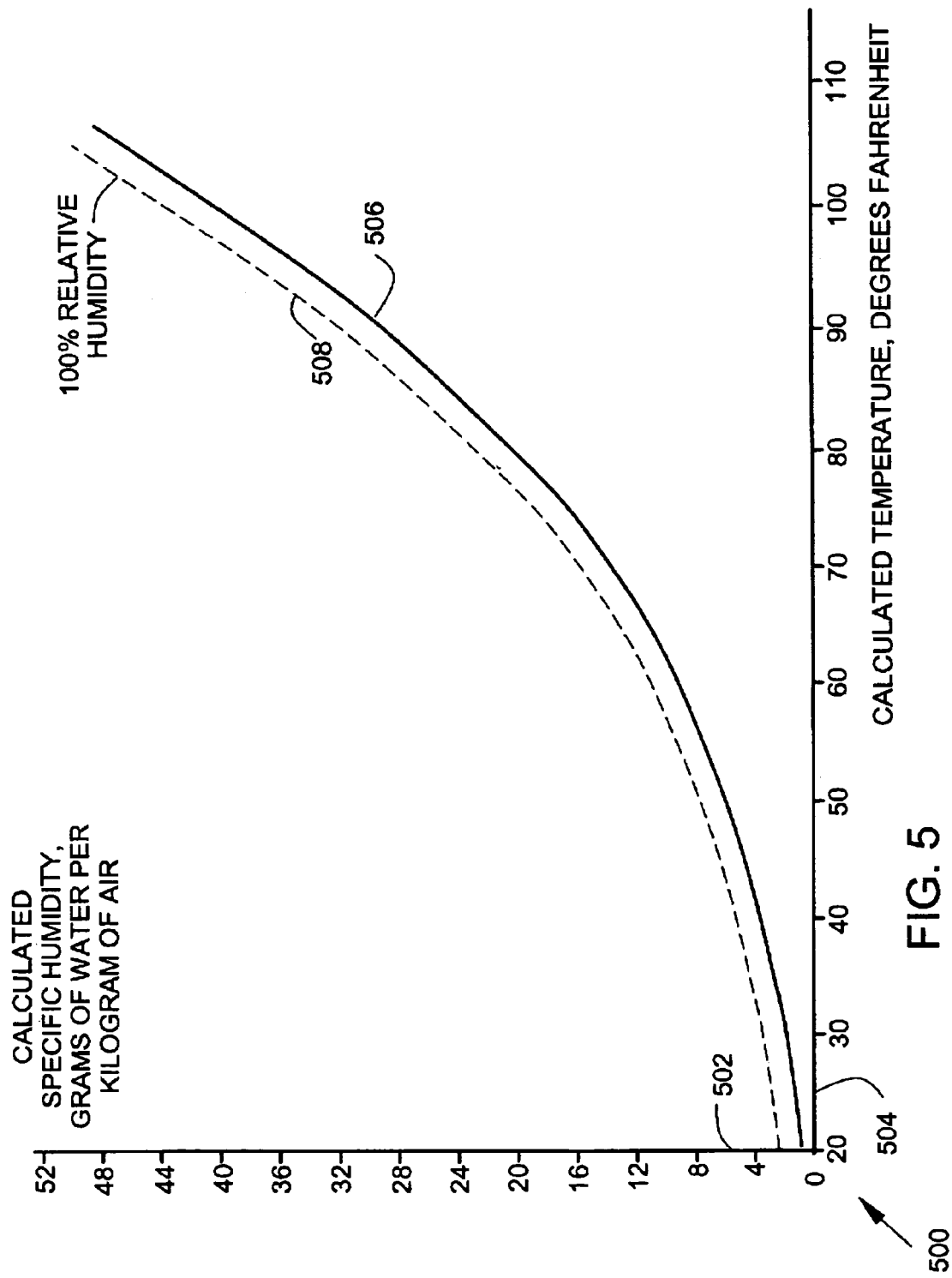
FIG. 5 illustrates a first embodiment of a condensing condition limit.

FIG. 5 illustrates a first embodiment of a condensing condition limit 506 that is set by the circuit 420. In FIG. 5, a vertical axis 502 represents a calculated specific humidity as calculated by circuit 420 based on the humidity transducer output 436, as optionally corrected by the temperature transducer output 432. A horizontal axis 504 represents a calculated temperature as calculated by circuit 420 based on the temperature transducer output 432. The circuit 402 also comprises the stored limit curve 506 (stored as a lookup table or an equation) that is slightly lower than the 100% relative humidity curve 508 in order to provide a margin for error in sensing approach to condensing conditions. When the calculated temperature and the calculated humidity are below the stored limit curve 506, then conditions are non-condensing and the condensing condition output 404 is not actuated. When the calculated temperature and the calculated humidity are above the stored limit curve 506, however, then conditions may be approaching condensing and the condensing condition output 404 is actuated to inhibit motion. The condensing condition output turns on during an approach to a condensing condition. The arrangement shown in FIG. 5 has the advantage of easy calibration of the stored limit curve 506 since it is readily measurable in standard engineering units of temperature and specific humidity.

Figure 6:
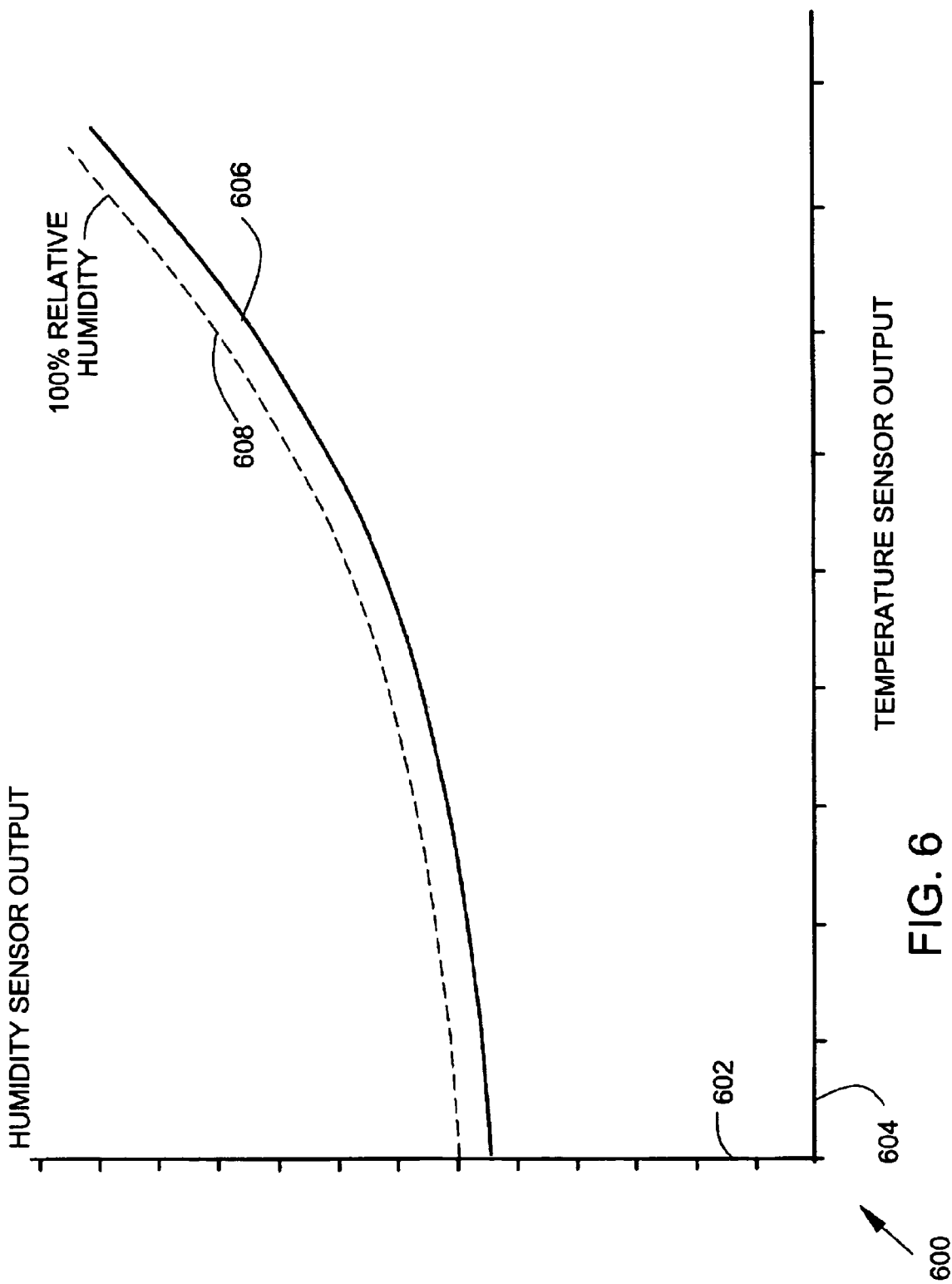
FIG. 6 illustrates a second embodiment of a condensing condition limit.

FIG. 6 illustrates a second embodiment of a condensing condition limit 606 that is set by the circuit 420. In FIG. 6, a vertical axis 602 represents the humidity transducer output 436. A horizontal axis 604 represents the temperature transducer output 432. The circuit 402 also comprises a stored limit curve 606 that is slightly lower than the 100% relative humidity curve 608 in order to provide a margin for error. In the example illustrated in FIG. 6, the relative humidity curve is defined in the nonstandard units of humidity transducer output and temperature transducer output, and no calculations are needed for correction or scaling to standard units of temperature and humidity. When the temperature and humidity transducer outputs are below the stored limit curve 606, then conditions are non-condensing and the condensing condition output 404 is not actuated. When the temperature and humidity transducer outputs are above the stored limit curve 606, however, then conditions may be approaching a condensing condition and the condensing condition output 404 is actuated to inhibit motion. The condensing condition output turns on during an approach to a condensing condition. The arrangement shown in FIG. 6 has the advantage of very little calculation burden in the circuit to ascertain when condensing conditions are present.

Figure 7:
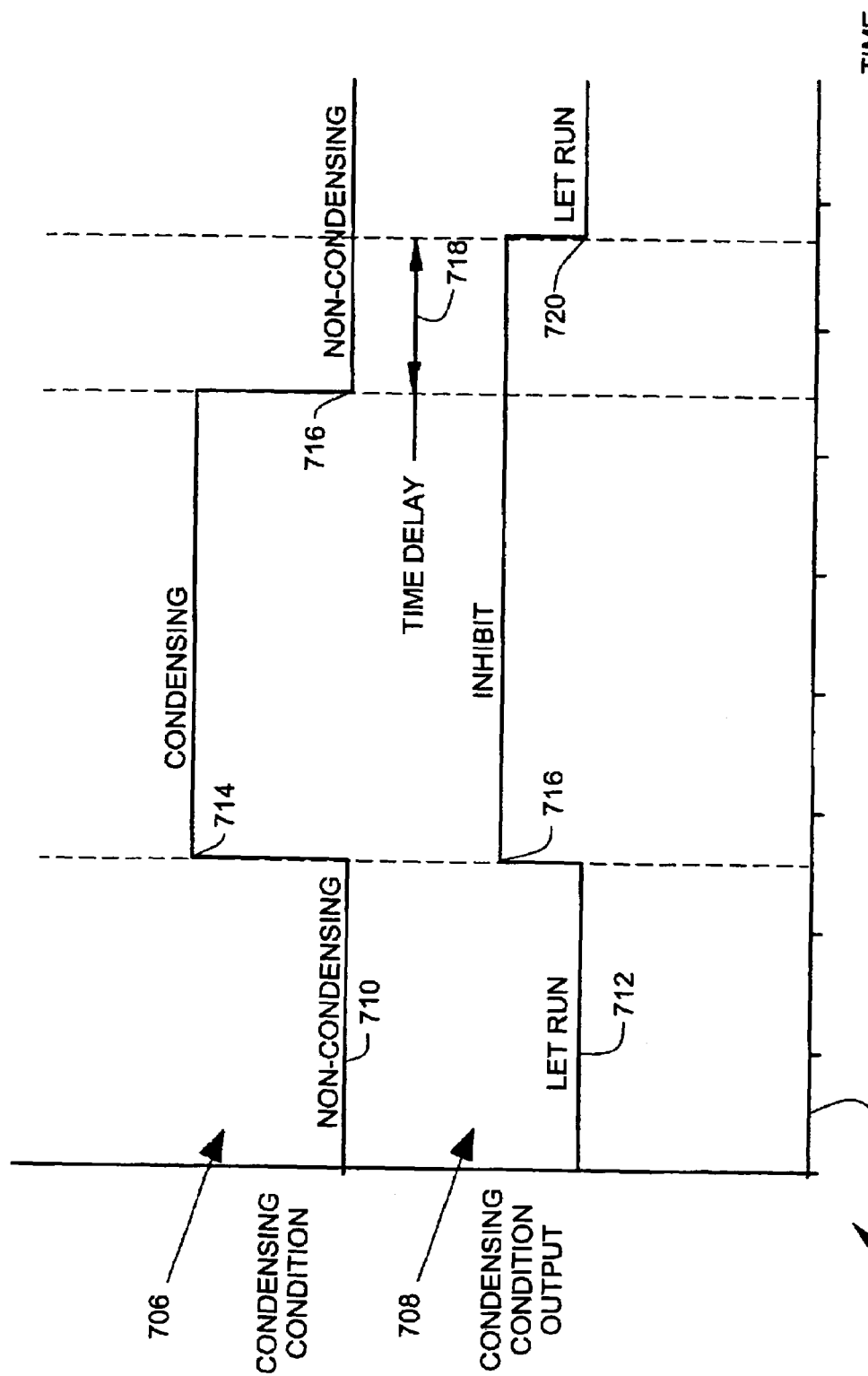
FIG. 7 illustrates a timing diagram illustrating a time delay in a condensing condition output.

FIG. 7 is a timing diagram 700 illustrating the effect of the timer 446 (FIG. 4) on the condensing condition output 404 (FIG. 4). A horizontal axis 704 of the timing diagram represents time. A first trace 706 represents condensing conditions in an enclosed assembly (such as enclosed assembly 306 in FIG. 2). A second trace 708 represents the condensing condition output 404. During initial non-condensing condition 710, a controller (such as controller 302 in FIG. 3) is allowed to run normally at 712. When conditions change to approach to a condensing condition at 714, then the condensing condition output 404 is actuated at 716 to inhibit motion. When conditions change back to non-condensing at 716, the condensing condition output 404 remains actuated for a time delay interval 718 before returning to a let run condition at 720. The time delay interval 718 is provided by the timer 446 (FIG. 4) and allow for a period of time after a potential condensing condition for condensation to evaporate before the inhibit is shut off. The time delay 718 can be a fixed time interval, or it can vary based on the output of the humidity transducer, the temperature transducer or both.

Figure 8:
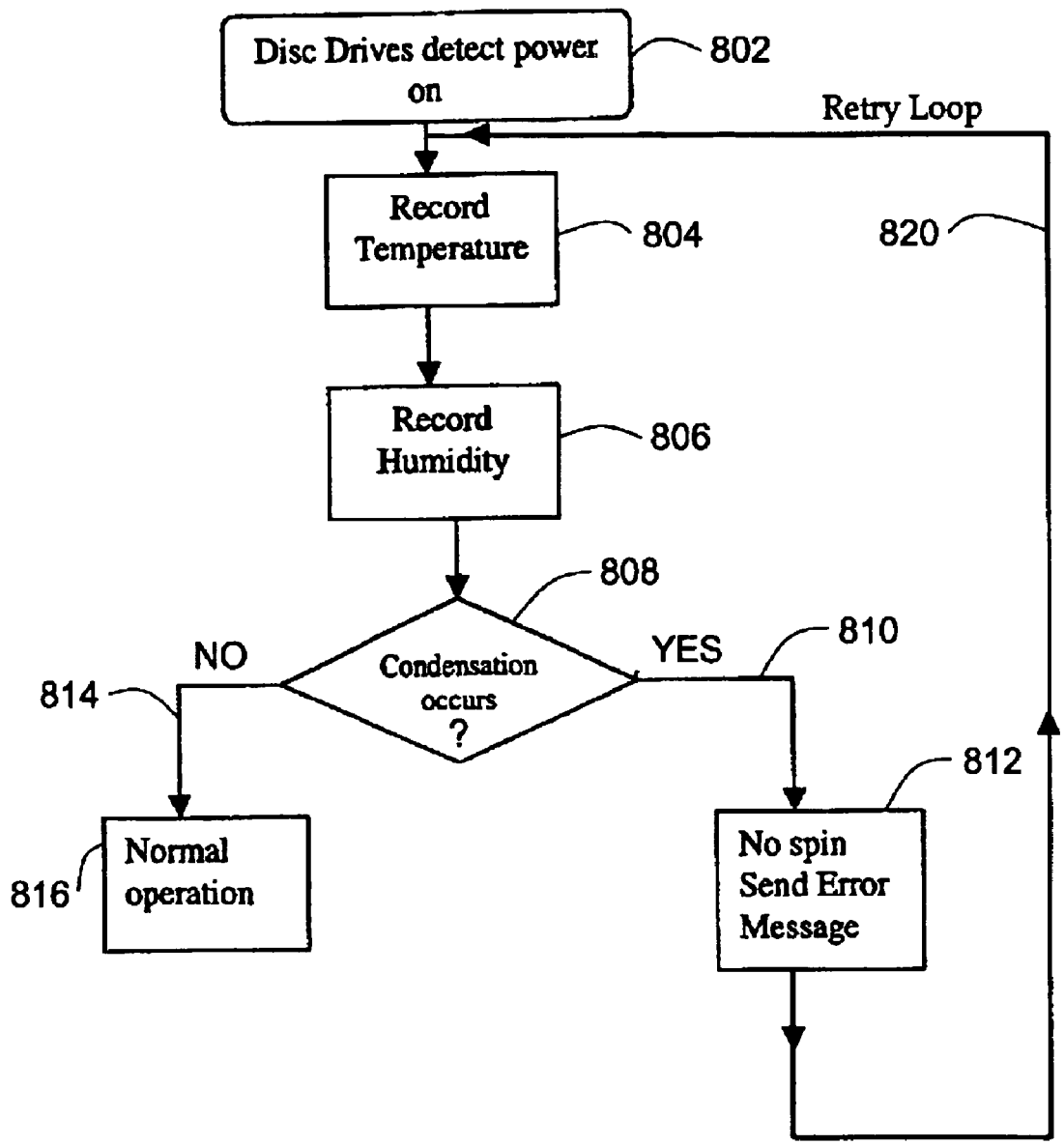
FIG. 8 illustrates a first embodiment of a method of inhibiting motion as a function of condensing conditions.

FIG. 8 illustrates a first embodiment of an automatic method of inhibiting motion in a disc drive as a function of condensing conditions. When power is applied to a disc drive, a circuit (such as circuit 320 in FIG. 4) detects that power is on at 802. After power is on, the sensed temperature is recorded at 804 and the sensed humidity is recorded at 806. Next, the sensed temperature and humidity are compared to a curve (such as curve 506 in FIG. 5 or curve 606 in FIG. 6) at decision block 808. If this comparison at decision block 808 indicates that condensing conditions are being approached, then program flow continues along line

810 to action block 812. At action block 812, spinning of the disc is inhibited and the spindle motor is stopped, the head is not loaded on the disc and an error message is generated. In a preferred arrangement, after an error message is generated at action block 812, program flow continues along a retry loop 820 back to action block 804. If this comparison at decision block 808 indicates that condensing conditions are not present, then program flow continues along ling 814 to action block 816. At action block 816, normal operation of motion control by the controller is started.

Figure 9:
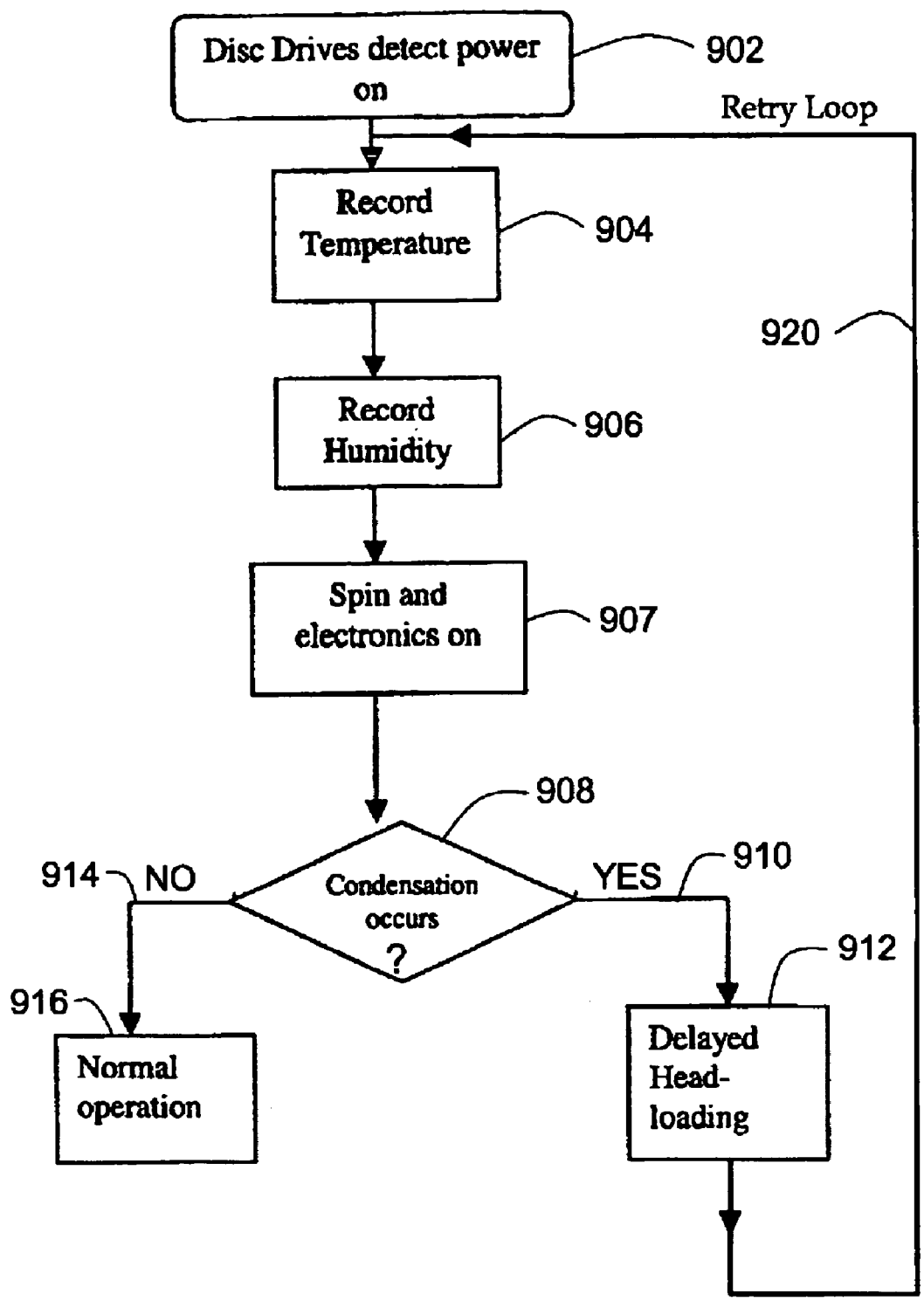
FIG. 9 illustrates a second embodiment of a method of inhibiting motion as a function of condensing conditions.

FIG. 9 illustrates a second embodiment of a method of inhibiting motion as a function of condensing conditions. When power is applied to a disc drive, a circuit (such as circuit 320 in FIG. 4) detects that power is on at 902. After power is on, the sensed temperature is recorded at 904 and the sensed humidity is recorded at 906. The disc motor is energized to spin the disc and the electronic circuits are energized at 907. Loading of the heads on the disc is inhibited at 907. Next, the sensed temperature and humidity are compared to a curve (such as curve 506 in FIG. 5 or curve 606 in FIG. 6) at decision block 908. If this comparison at decision block 908 indicates that condensing conditions are being approached, then program flow continues along line 910 to action block 912. At action block 912, the loading of the heads onto the disc is delayed until the operation of spindle motor in spinning disc and the electronics (or a heater) warms up the disc drive enough to evaporate any condensation. In a preferred arrangement, after an error message is generated at action block 912, program flow continues along a retry loop 920 back to action block 904. If this comparison at decision block 908 indicates that condensing conditions are not present, then program flow continues along ling 914 to action block 916. At action block 916, the inhibiting of the head loading is shut off and normal operation of motion control by the controller is started.

This arrangement prevents a head crash and also actively warms up the disc drive to eliminate condensing conditions. Centrifugal force tends to spin condensate off the surfaces of the discs.

Figure 10:
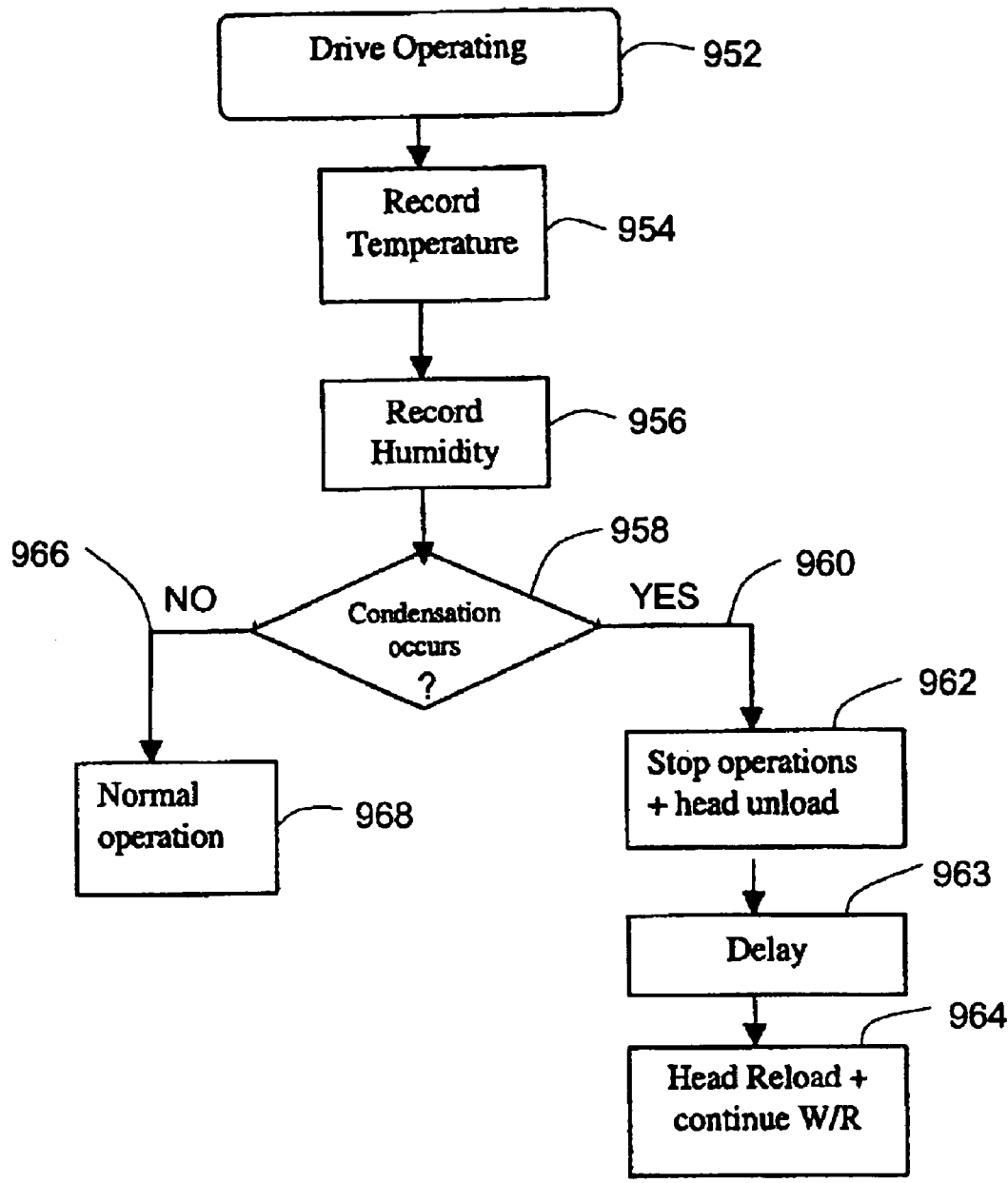
FIG. 10 illustrates a third embodiment of a method of inhibiting motion as a function of condensing conditions.

FIG. 10 illustrates a third embodiment of a method of inhibiting motion as a function of condensing conditions that occur while the motion controls system in the disc drive is already in normal operation. Normal disc drive operation is already underway at 952. Next, the sensed temperature is recorded at 954 and the sensed humidity is recorded at 956. Next, the sensed temperature and humidity are compared to a curve (such as curve 506 in FIG. or curve 606 in FIG. 6) at decision block 958. If this comparison at decision block 958 indicates that condensing conditions are being approached, then program flow continues along line 960 to action block 962. At action block 962, the loading of the heads onto the disc is inhibited. Program flow continues to action block 963 where there is a delay waiting for non-condensing conditions and evaporation of any condensate, and then the heads are reloaded and normal operation is resumed at action block 964. If this comparison at decision block 958 indicates that condensing conditions are not present, then program flow continues along line 966 to action block 968. At action block 968, normal operation of motion control by the controller resumes.

The case described in FIG. 10 can occur when the drive is operating (writing or reading) and if the temperature suddenly changes beyond the dew point of the hard disc drive. An example of such an event is the user is playing his MP3 player and walks from a very cold air-conditioned mall onto the street on a humid summer day.

In this event, a head unload is executed. The disc continues to spin and electronics are left on. Once it the moisture is removed, the head is reloaded and operations continue.

In summary, a motion control system (such as 300) comprises an enclosed assembly (such as 306) that encloses moving parts (such as 308). The motion control system also comprises a controller (such as 302) that controls a motion of the moving parts and that has an inhibit input (such as 312) that inhibits the motion.

The motion control system further comprises a sensor (such as 314) that provides sensor outputs (such as 316). The sensor outputs depend on an assembly temperature and an assembly humidity in the enclosed assembly.

The motion control system also includes a circuit (such as 320) that provides a condensing condition output (such as 304). The condensing condition output couples to the inhibit input. The condensing condition output controls inhibition of the motion as a function of the sensor outputs.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the motion control system while maintaining substantially the same functionality without departing from the scope and spirit of the present invention. In addition, although the preferred embodiment described herein is directed to a disc drive system for data storage, it will be appreciated by those skilled in the art that the teachings of the present invention can be applied to other motion control systems, without departing from the scope and spirit of the present invention.

What is claimed is:

1. A control system, comprising:
   a controller controlling a motion of a head moving on a disc enclosed in an enclosed assembly, the controller having an inhibit input that inhibits the motion;
   a sensor providing sensor outputs dependent on an assembly temperature and an assembly humidity in the enclosed assembly; and
   a circuit providing a condensing condition output to the inhibit input as a function of the sensor outputs.

2. The control system of claim 1 wherein the sensor comprises a humidity transducer and a temperature transducer.

3. The control system of claim 2 wherein the humidity transducer has a temperature sensitivity and the circuit provides correction for the temperature sensitivity.

4. The control system of claim 2 wherein the humidity transducer has a humidity transducer temperature that is higher than the assembly temperature.

5. The control system of claim 1 wherein the condensing condition output turns on during an approach to a condensing condition.

6. The control system of claim 1 wherein the condensing condition output is on during a time interval after a condensing condition.

7. The control system of claim 1 wherein the enclosed assembly comprises a magnetic storage device.

8. The control system of claim 7 wherein the magnetic storage device comprises a hard disc drive.

9. The control system of claim 8 wherein the hard disc drive includes a head actuator and the motion of the head actuator is inhibited while the inhibit input is on.

10. The control system of claim 9 wherein the hard disc drive includes a spindle motor and the spindle motor is actuated while the inhibit input is on.

11. The control system of claim 9 wherein the disc drive includes a spindle motor and the spindle motor is inhibited while the inhibit input is on.

12. The control system of claim 9 further comprising a heater in the enclosed assembly, the heater being energized when the condensing condition output is on.

13. The control system of claim 1 wherein the enclosed assembly is sealed except for a filter.

14. A method of controlling motion, comprising:
controlling a motion of a head moving on a disc enclosed in an enclosed assembly;
providing an inhibit input to inhibit the motion;
providing sensor outputs dependent on an assembly temperature and an assembly humidity in the enclosed assembly; and
providing a condensing condition output to the inhibit input as a function of the sensor outputs.

15. The method of claim 14 wherein the sensor outputs comprises an output of a humidity transducer and an output of a temperature transducer, and the method further comprises:
correcting the output of the humidity transducer as a function of the output of the temperature transducer.

16. The method of claim 15, further comprising:
heating the humidity transducer.

17. The method of claim 15, further comprising:
heating the temperature transducer.

18. The method of claim 14, further comprising:
turning on the condensing condition output during an approach to a condensing condition.

19. The method of claim 14, further comprising:
turning on the condensing condition output during a time interval after a condensing condition.

20. The method of claim 14 wherein the enclosed assembly comprises a magnetic storage device.

21. The method of claim 20 wherein the magnetic storage device comprises a hard disc drive.

22. The method of claim 21 further comprising:
inhibiting motion of a head actuator in the hard disc drive while the inhibit input is on.

23. The method of claim 22, further comprising:
actuating a spindle motor in the disc drive while the inhibit input is on.

24. The method of claim 22, further comprising:
inhibiting a spindle motor while the inhibit input is on.

25. The method of claim 22, further comprising:
energizing a heater in the enclosed assembly when the condensing condition output is on.

26. The method of claim 14 further comprising:
sealing the enclosed assembly except for a filter.

27. A control system, comprising:
a controller controlling a motion of a head moving on a disc enclosed in an enclosed assembly, the controller having an inhibit input that inhibits the motion;
a sensor providing sensor outputs dependent on an assembly temperature and an assembly humidity in the enclosed assembly; and
means for providing a condensing condition output to the inhibit input as a function of the sensor outputs.

28. The control system of claim 27 further comprising:
sealing the enclosed assembly except for a filter.

29. The control system of claim 27 wherein the enclosed assembly comprises a magnetic storage device.

30. The control system of claim 29 wherein the magnetic storage device comprises a hard disc drive.

* * * * *